(12) United States Patent
Aymeric et al.

(10) Patent No.: US 9,202,381 B2
(45) Date of Patent: Dec. 1, 2015

(54) METHOD FOR DISPLAYING AN AERONAUTICAL FLIGHT PLAN COMPRISING A STEP OF FLIGHT DATA CONFIGURATION

(71) Applicant: THALES, Neuilly sur Seine (FR)

(72) Inventors: Bruno Aymeric, St Medard en Jalles (FR); Cécile Andre, Bordeaux (FR); Yannick Le Roux, St Medard en Jalles (FR); François Michel, St Medard en Jalles (FR)

(73) Assignee: Thales, Neuilly sur Seine (FR)

( * ) Notice: Subject to any disclaimer, the term of this patent is extended or adjusted under 35 U.S.C. 154(b) by 106 days.

(21) Appl. No.: 14/069,272

(22) Filed: Oct. 31, 2013

(65) Prior Publication Data

US 2014/0156114 A1 Jun. 5, 2014

(30) Foreign Application Priority Data

Nov. 30, 2012 (FR) ...................... 12 03244

(51) Int. Cl.
*G01C 23/00* (2006.01)
*G08G 5/00* (2006.01)

(52) U.S. Cl.
CPC ............. *G08G 5/003* (2013.01); *G01C 23/00* (2013.01); *G08G 5/0021* (2013.01); *G08G 5/0034* (2013.01); *G08G 5/0039* (2013.01)

(58) Field of Classification Search
None
See application file for complete search history.

(56) References Cited

U.S. PATENT DOCUMENTS 5,111,402 A * 5/1992 Brooks et al. ................. 701/29.2

| | | | |
|---|---|---|---|
| 6,236,913 B1 | 5/2001 | Bomans et al. | |
| 6,522,958 B1 | 2/2003 | Dwyer et al. | |
| 6,542,796 B1 | 4/2003 | Gibbs et al. | |
| 7,194,353 B1 * | 3/2007 | Baldwin et al. | ............... 701/528 |

(Continued)

FOREIGN PATENT DOCUMENTS

| | | | | |
|---|---|---|---|---|
| EP | 2 048 477 A2 | | 4/2009 | |
| EP | 12382206 | * | 5/2012 | ............... G08G 5/00 |
| FR | 2 969 124 A1 | | 6/2012 | |

OTHER PUBLICATIONS

William Strunk Jr. and E.B. White, The Elements of Style $3^{rd}$ Edition, 1979, all pages.*

(Continued)

*Primary Examiner* — Calvin Cheung

(74) *Attorney, Agent, or Firm* — Blakely, Sokoloff, Taylor & Zafman LLP

(57) ABSTRACT

The general field of the invention is that of methods of graphic representation, modification and validation of an aeronautical flight plan for an aircraft avionics system. The system comprises means for computing and generating said flight plan, a task management system, a visualization device displaying a graphic representation of said flight plan and a man-machine interface suitable for making selections, modifications or additions to the information contained in said graphic representation, said selections, modifications and additions being taken into account by the task management system, said graphic representation containing a timeline on which feature at least the various phases of the flight plan and the information corresponding to said phases. The method according to the invention contains a step of displaying at least one item of information depending on several parameters and the graphic representation of which depends on the level of available information about said parameters.

6 Claims, 4 Drawing Sheets

(56) References Cited

U.S. PATENT DOCUMENTS

| | | | |
|---|---|---|---|
| 7,693,621 B1* | 4/2010 | Chamas | 701/16 |
| 8,145,365 B2* | 3/2012 | Flotte et al. | 701/8 |
| 8,701,953 B2* | 4/2014 | Bopp et al. | 224/547 |
| 8,843,302 B2* | 9/2014 | de Blanes et al. | 701/120 |
| 8,977,481 B1* | 3/2015 | Downs | 701/120 |
| 2001/0023390 A1* | 9/2001 | Gia | 701/301 |
| 2002/0165647 A1* | 11/2002 | Glenn et al. | 701/3 |
| 2008/0027629 A1 | 1/2008 | Peyrucain et al. | |
| 2008/0270331 A1* | 10/2008 | Taylor et al. | 706/13 |
| 2009/0070123 A1* | 3/2009 | Wise et al. | 705/1 |
| 2009/0105943 A1* | 4/2009 | Ferro et al. | 701/202 |
| 2009/0115636 A1 | 5/2009 | Shibata | |
| 2010/0250026 A1 | 9/2010 | Deker et al. | |
| 2012/0206358 A1* | 8/2012 | Green et al. | 345/163 |
| 2012/0283897 A1* | 11/2012 | Barraci et al. | 701/3 |
| 2012/0319869 A1* | 12/2012 | Dorfmann et al. | 340/945 |
| 2013/0317739 A1* | 11/2013 | Coulmeau et al. | 701/465 |
| 2014/0018976 A1* | 1/2014 | Goossen et al. | 701/2 |
| 2014/0039783 A1* | 2/2014 | White et al. | 701/120 |
| 2015/0066253 A1* | 3/2015 | Hayes | 701/3 |

OTHER PUBLICATIONS

MerriamWebster's' Collegiate Dictionary, 1993, all pages.*
French Search Report and Written Opinion for Corresponding French Application No. 12/03244, 9 pages, (May 3, 2013).

* cited by examiner

METHOD FOR DISPLAYING AN AERONAUTICAL FLIGHT PLAN COMPRISING A STEP OF FLIGHT DATA CONFIGURATION

BACKGROUND OF THE INVENTION

1. Field of the Invention

The field of the invention is that of the presentation, modification and validation of the aeronautical flight plans presented on aircraft cockpit visualization devices.

2. Description of the Prior Art

Aircraft cockpits contain several visualization screens intended to present to the pilot the necessary information for piloting or navigation. By means of man-machine interfaces the pilot can control, modify and validate this information. Generally, the flight plans are presented in text form. The screen displays a cartographic representation of the overflown terrain containing the flight plan with its various waypoints. This cartographic representation includes a table containing several rows. Each row represents a waypoint and supplies a certain amount of data relating to this waypoint such as, for example, the provisional time of transit, fuel consumption, etc.

This representation has a certain number of drawbacks. It only represents the flight phase of the craft and includes no information relating to the taxiing phase, towards the runway or the stand. This representation is sequential. Each row corresponds to one waypoint and all the waypoints are treated in the same way, whereas they may, for example, be separated by very different distances. Thus, whatever the distance between two points, the display between these waypoints is the same. Moreover, the various actions to perform to provide or look ahead to the various phases of the flight are not present and are only accessible on other visualization screens and by other means.

The Applicant has filed a patent application published under the reference FR 2 969 124 and titled "Procédé d'affichage temporel de la mission d'un aéronef" ("Method for time-based display of an aircraft mission") proposing a different way of presenting aeronautical flight plans. In this way of presenting, the various steps of the flight plan are displayed in a graphic window containing a scaled time axis or Timeline, the various steps being displayed opposite the time of their performance.

SUMMARY OF THE INVENTION

The method for displaying an aeronautical flight plan according to the invention reuses this Timeline concept. It also includes a representation of certain items of information that are dependent on the level of configuration of said items of information.

More precisely, the subject of the invention is a method of graphic representation, modification and validation of an aeronautical flight plan for an aircraft avionics system, said system comprising means for computing and generating said flight plan, a system for managing the tasks necessary to the performance of said flight plan, a visualization device displaying a graphic representation of said flight plan and a man-machine interface suitable for making selections, modifications or additions to the information contained in said graphic representation, said selections, modifications and additions being taken into account by the task management system, said graphic representation containing a timeline on which feature at least the various phases of the flight plan and the information corresponding to said phases, Characterized in that the method contains a step of displaying at least one item of information depending on several parameters and the graphic representation of which depends on the level of available information about said parameters.

Advantageously, the information being displayed in the form of a text composed of alphanumeric characters, the contrast and/or the colour and/or the size of the alphanumeric characters depends on said level of available information about said parameters.

Advantageously, the selection of said information by means of the man-machine interface leads to the opening of a graphic window containing the list of the names of the parameters to inform, said parameters being able to be validated, modified or completed by means of the man-machine interface.

Advantageously, the man-machine interface is a touch-sensitive surface arranged on the visualization device.

BRIEF DESCRIPTION OF THE DRAWINGS

The invention will be better understood and other advantages will become apparent on reading the following description, which is in no way limiting and refers to the appended figures, in which.

DETAILED DESCRIPTION

The implementation of the method according to the invention is carried out in an aircraft avionics system. This contains at least:

A flight management computer comprising the computing means and information needed to compute forecasts on the flight plan;

A breakdowns and alerts management computer known as the Flight Warning System;

A pilot flight information visualization device. This device is generally a flat screen arranged on the control panel;

A system for managing the actions to perform to change the phase of flight;

A man-machine interface. It is preferable that this interface be a so-called "multi-touch" touch-sensitive surface allowing the pilot to select, modify and validate the information necessary for the flight in a very simple manner. However, a conventional interface system comprising a graphic cursor guided by a controller of computer "mouse" type is also suitable. In the following text, the man-machine interface is a touch-sensitive interface.

Of course, this list of means is not exhaustive. The system may contain dedicated means for meteorological information likely to affect flight conditions. More generally, the system may contain any means having an effect on the progress of an aircraft flight. These various means are present in all recent aircraft.

It should be noted that the term "flight plan" is understood to mean the totality of the mission carried out by the aircraft, said mission beginning with the taxiing phase before take-off and ending with the taxiing phase after landing of the aircraft.

The method according to the invention is implemented in the framework of a graphic presentation of the flight plan containing a Timeline. It is known that this type of graphic representation delivers logical link support between all the items of information necessary to the performance of the flight.

Figure 1:
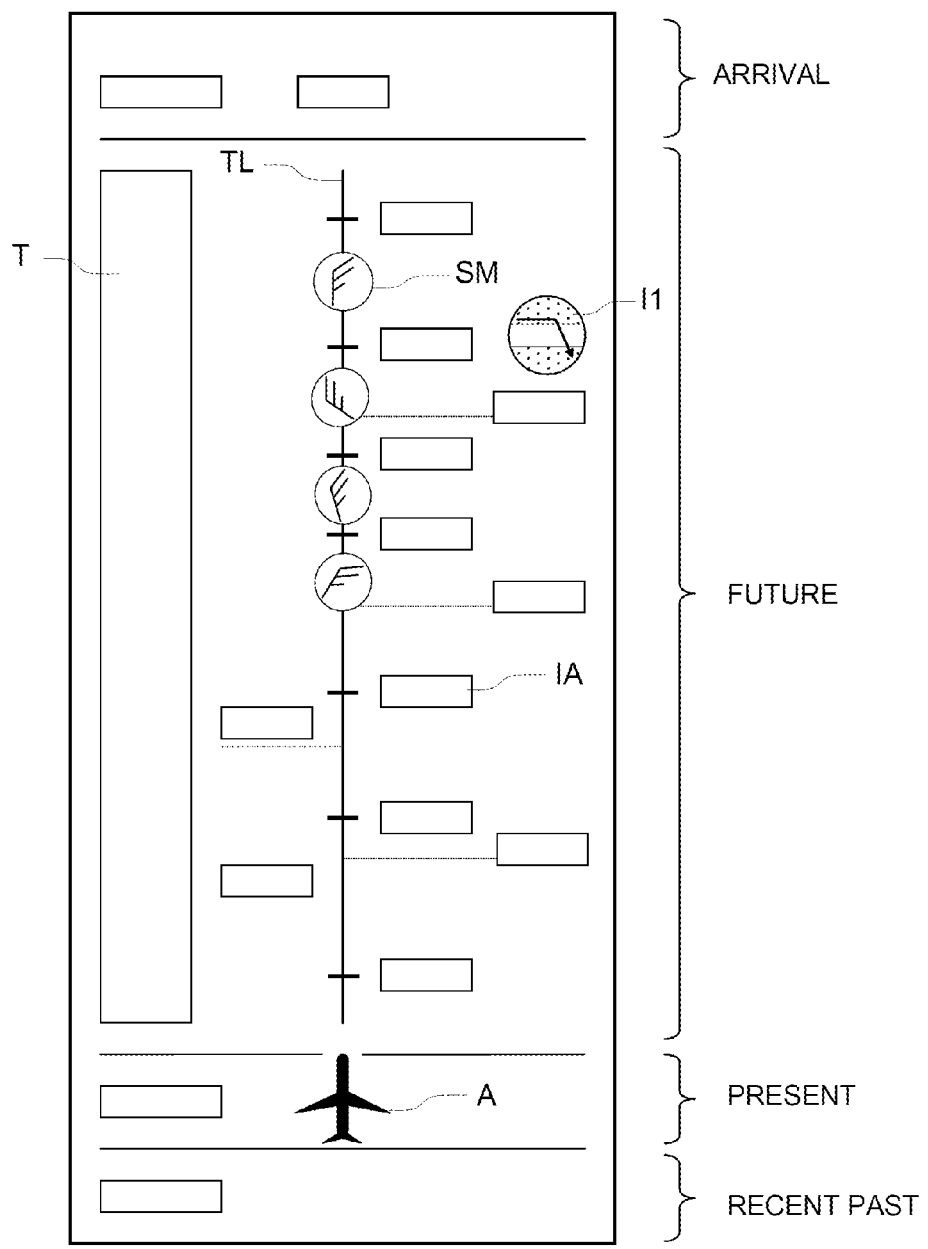
FIG. 1 represents a general view of the graphic representation of a flight plan according to the invention.

A graphic representation of the flight plan according to the invention is shown in FIG. 1. It contains a scaled time axis T or "timeline" T, the various phases of flight being displayed opposite the time corresponding to their performance. Preferably, the description of the flight is oriented from bottom to top. In fact, the cartographic display of the flight is usually oriented in this direction. The pilot may then more easily make the connection between the cartographic display and the text display of the flight plan. The timeline contains a symbol representing an "aeroplane" model A. This model is situated, in standard operating mode, on the timeline at the current time. This graphic representation also contains the essential alphanumeric information IA about the required velocities, the required altitudes and the waypoints. The various figures also contain meteorological symbols SM representing the wind or meteorological phenomena. These symbols are conventionally represented by a system of directional arrows, wind barbs and pennants.

Figure 2:
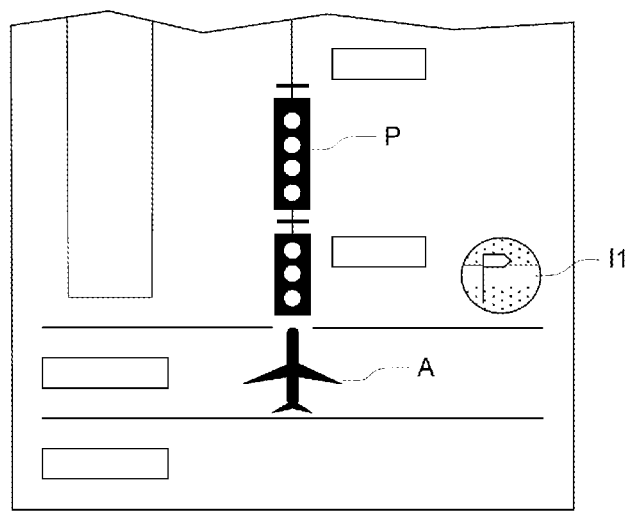
FIG. 2 represents a first partial detail view of a flight plan according to the invention.

The various phases of the flight are structured into several zones:
- A first zone relating to the recent past, denoted "RECENT PAST" When the flight has begun, this zone provides a reminder of the time of transit and other important parameters at the moment of passing particular waypoints. When the aircraft is effectively in flight, the crew may thus check these parameters against the forecasts made before the flight;
- A second zone relating to the present, denoted "PRESENT", in which are found, for example, the present time and the current mass of the aircraft;
- A third zone describing the flight as a whole, denoted "FUTURE". The pilot can control the beginning and the duration of the time slot displayed: the beginning may be either the current time, or a future time, or possibly a time in the past. Modifying the beginning of the slot is equivalent to moving in time. Modifying the duration makes it possible to see and to "zoom" in to more or less information. The system automatically manages the alterations to the display of the information as a function of the requested duration. For example, in FIG. 2, the requested duration is not compatible with a display of all the information relating to the phase of taxiing or take-off or "SID" (Standard Instrument Departure), so the system then only represents points P. On the other hand, certain important information contained in these phases is maintained. For example, the point where the flight management system foresees the attainment of a preset altitude may be permanently maintained;
- A fourth zone relating to the arrival, denoted "ARRIVAL". Here the time of arrival and distance to the destination are shown. If an emergency airport is defined in the flight plan, this airport is indicated along with the fuel forecast on arrival at this airport. This fuel forecast relates to the destination airport if no emergency airport has been defined.

The first so-called "recent past" zone is intended to enable the verification of the initial forecasts made before the flight against the actual performance during the flight. Thus, the selection of any element displayed in the recent past gives access to the display of a depiction representing the initial forecasts throughout the flight plan and the numbers achieved during the flight. Large deviations are highlighted in particular.

In the third flight zone, the operator can perform various actions and configurations by using this zone. By way of example, he can configure the time slot displayed with very intuitive touch gesture interactions. When the beginning of the time slot is not the present, the separation between the present and flight zones is more marked. The aeroplane model is also represented differently. In this case, an interaction on this model makes it possible to immediately return the beginning of the time slot to the present. This interaction may be, for example, a double tap on the graphic representation of the model.

If the duration of the time slot is too small, source information is condensed. On the other hand, source information always remains available. For example, in FIG. 2, it can be seen that the taxiing and departure phases have been condensed. The points are only represented by dots and underlining identifies that a condensed phase is involved. In this configuration, a simple action makes it possible to select a time slot containing the phase alone.

Figure 3:
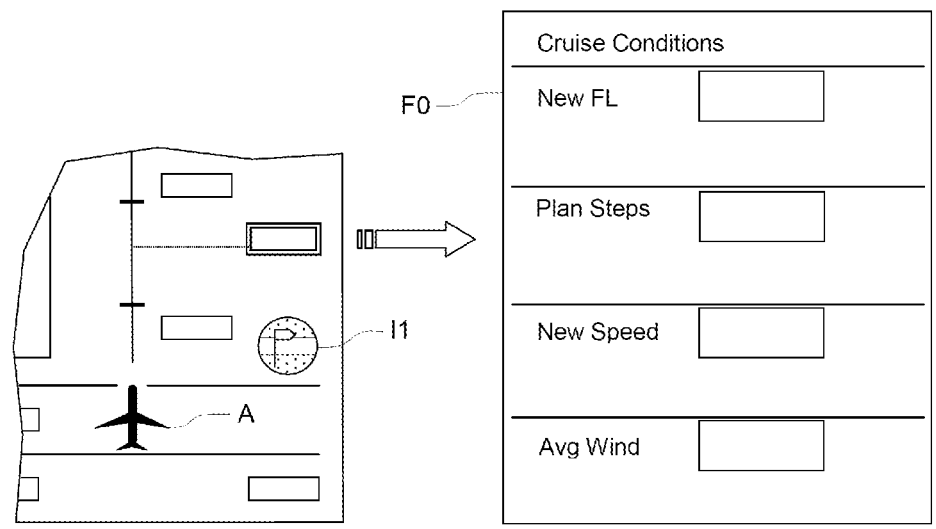
FIG. 3 represents a second partial detail view of a flight plan according to the invention.

Only the time is displayed over all of the waypoints. The fundamental velocity and altitude data are only displayed where they are characteristic. In the same way, the data concerning meteorological conditions and in particular the wind speed and direction are only displayed where they are characteristic. The display of these values enables the pilot to modify these configurations if desired, by selecting them as seen in FIG. 3. A window F0 then appears containing the detailed configuration information.

The fourth so-called arrival zone summarizes the most important forecasts and allows key actions relating to flight management. The items of information presented preferably are:
- The time of arrival at the destination. Selecting the time of arrival opens an interface making it possible to configure anything that can affect the time of arrival in an intuitive manner. For example, this interface allows the ground to enter the take-off time, to influence the selected cruise velocity, etc.
- The destination. Selecting this field summons an interface providing more complete forecasts at destination, such as, for example, the quantity of fuel remaining, and makes it possible to manage rerouting by selecting a new destination;
- The "Alternative" or emergency airport. When this field has not yet been filled, selecting it allows access to a menu for inputting this airport. If it has already been input, the interface makes it possible to activate this airport and make it the new destination, or to consult more complete forecasts.
- The quantity of fuel forecast at the moment of landing at the emergency airport. The presentation of this information is supplemented by an item of trend and alarm information if the forecast of the remaining quantity is drifting downwards. As the flight progresses, the forecast quantity of fuel decreases, and this is indicated to the pilot, in the form, for example, of an arrow to the right of the numerical value, pointing downwards. If the quantity approaches a critical minimum value, this is also represented, for example by changing the colour of the arrow.

The method according to the invention contains a step of displaying at least one item of information depending on several parameters and the graphic representation of which depends on the level of available information about said parameters. In this way forecast reliability is managed.

Generally, the method is implemented in the following manner:

For all the information displayed to the pilot, the parameters included in the computation are identified. These parameters are classified into various categories including at least three categories:

Absolutely necessary. If this parameter is absent, the information is not computed and is replaced by the symbol "XXX", for example, Necessary. If this parameter is absent, a default value is used and the information is represented in shaded form. The information being displayed in the form of a text composed of alphanumeric characters, the contrast and/or the colour and/or the size of the alphanumeric characters depends on said level of available information about the parameters. In the figures, the shaded characters are symbolized by a thin black outline.

The loss of precision cannot be evaluated, but must be limited to the definition.

Optional. If this parameter is absent, a default value is used but the information is represented in the normal way.

When the pilot selects the displayed information, an interface appears making it possible to directly input the absolutely necessary and necessary parameters. This interface enables access in a second step to optional parameters.

The "Necessary" level is a level which can be subdivided. For example, it is possible to install a "Necessary Optional" level for which the pilot could force a normal display even though no input has been made.

Advantageously, the level of representation of an item of information may vary as a function of certain conditions. For example, at the beginning of a flight, it is not expected that the crew will input a destination runway or arrival procedure since these items of information are not necessarily available. On the other hand, some time before the beginning of the descent, these items of information must be known. Thus, some time before the beginning of the descent, the representation of the time and the quantity of fuel at destination may change. If the crew selects one of these items of information, the input of the arrival runway or arrival procedure becomes a proposed option.

Advantageously, the representation of an item of information may be affected by its proximity to safety thresholds. For example, if a parameter that is just necessary is absent, but the computation of the fuel quantity at destination is close to a minimum value, the system may represent the quantity of fuel by "XXX", as if an "absolutely necessary" parameter was absent.

By way of a first example, a time of transit over a waypoint is only 100% reliable when all the parameters necessary to its computation have been entered or validated by the pilots. Thus if the take-off time has not been entered, the system presents the time of transit in a "reduced" depiction.

When the forecasts are not reliable, one of the parameters at least among the time of arrival, the quantity of fuel needed to home towards an emergency airport, or again the distance to destination, is thus represented in a reduced depiction. The selection of one of these parameters gives access to an interface enabling completion of the configuration in order to obtain a correct level of reliability.

By way of a second example, the following operational cases are of particular interest. In a first case, the autopilot no longer follows the flight plan. The crew has selected what is known as a "selected" mode, for example the "heading" mode in which the autopilot maintains a predetermined heading. At this moment, the forecasts can no longer be fulfilled since the system does not know the moment and the manner of rejoining the flight plan. The interface enabling improvement of forecast reliability allows the pilots to provide the system with a rejoining trajectory. This is achieved by way of the graphic representation. From that moment, and for as long as the actual rejoining method corresponds to the trajectory entered by the pilot, the forecast is displayed on the basis of a "reliable" depiction. In a second case, the pilot has not inserted an arrival procedure.

Figure 4:
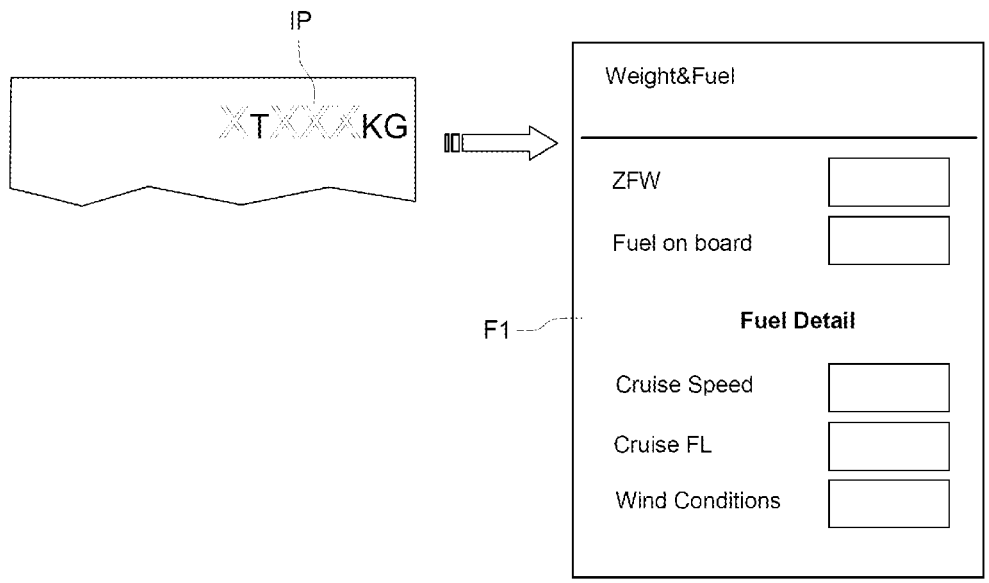
FIGS. 4, 5 and 6 represent three views of a graphic representation of an item of information depending on several parameters, the graphic representation depending on the level of available information about said parameters.
Figure 5:
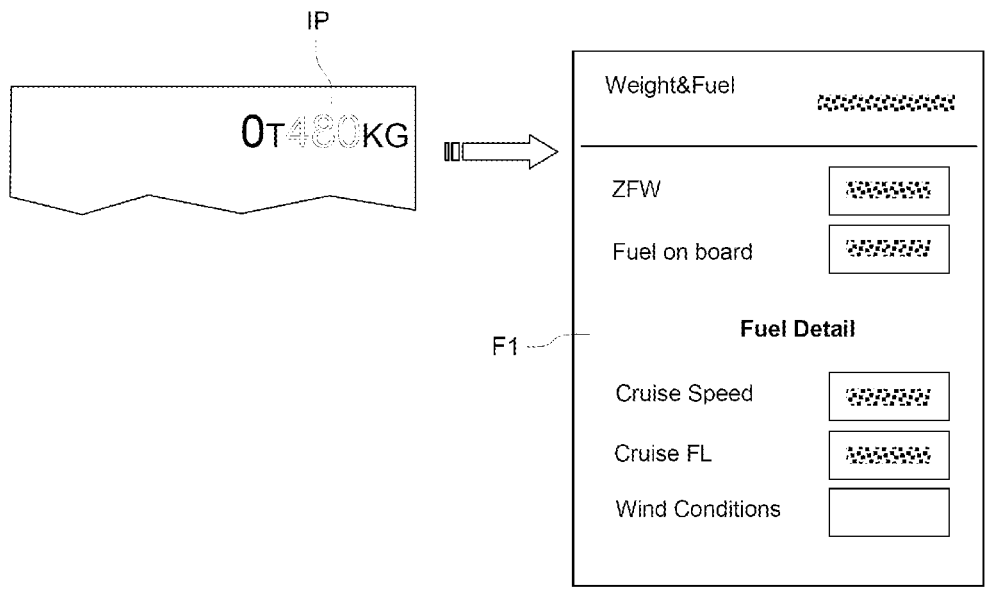
Figure 6:
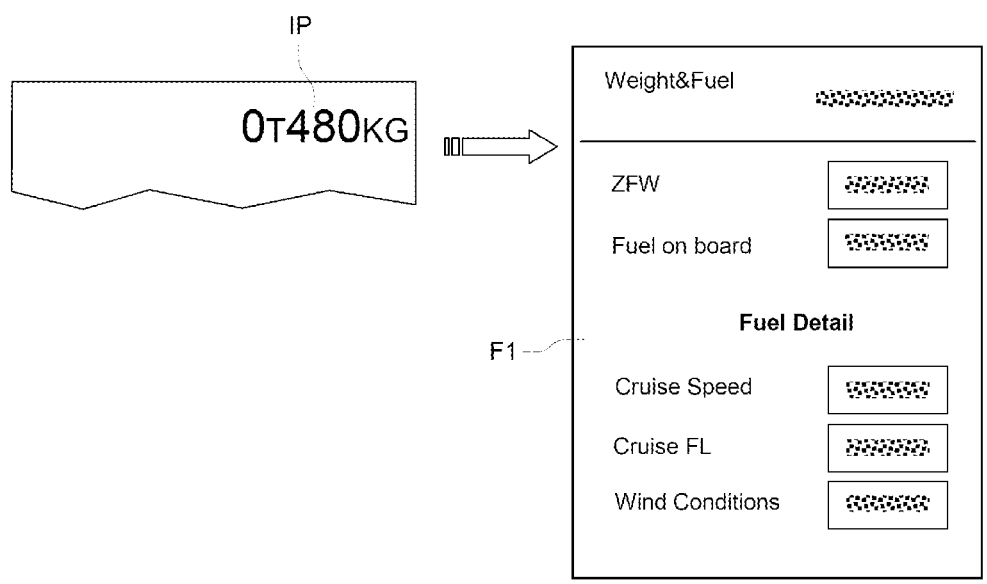

By way of a third example illustrated in FIGS. 4, 5 and 6, the quantity of fuel at destination depends on many parameters that the pilot must input. The following is a non-exhaustive list of these parameters:

The destination,
The route to follow,
The flight level,
The velocity regime to be followed,
The mass of the aeroplane without fuel,
The quantity of fuel,
The wind the aeroplane will experience during flight,
The estimated consumption for the taxiing phase.

In the absence of some of these parameters, the computation cannot be performed and the value cannot be computed. In this case, the system offers an IP display of "XTXXXKG" type prompting the pilot to select this information as seen in FIG. 4. If he does, an interface F1 makes it possible to input the parameters.

If all of the parameters have not been filled in, the quantity of fuel at the destination is represented in a greyed-out area to indicate that major parameters have not been input, as seen in FIG. 5. The interface F1, which appears upon selection by a pointer for this "quantity of fuel" data item, makes it possible to input the cruise conditions.

If, for example, the velocity and flight level parameters are entered, the representation of the quantity of fuel may change to a less "reduced" representation which indicates that the main parameters have now been input but that other parameters have yet to be provided.

When all of the parameters have been input, the IP representation is nominal, as seen in FIG. 6. Even in this case, the pilot may add an even greater level of detail if desired. For example, the "Fuel Detail" selection makes it possible to access a richer interface enabling the input of the fuel consumption forecasts in the taxiing phase.

What is claimed is:

1. A method of graphic representation, modification and validation of an aeronautical flight plan for an aircraft avionics system, the aircraft avionics system comprising:
    a flight management computer that generates the flight plan;
    a task management system that manages tasks necessary for performance of the flight plan;
    a visualization device displaying a graphic representation of the flight plan; and
    a man-machine interface suitable for making selections of, modifications to, or additions to information contained in the graphic representation,
        the selections, modifications, and additions being taken into account by the task management system,
        the graphic representation containing:
            a timeline that features one or more phases of the flight plan, and
            information corresponding to the one or more phases, wherein the method includes:

displaying at least one item of information depending on several parameters and the graphic representation of which depends on a level of available information about the parameters, the parameters being classed into three categories:

absolutely necessary; wherein, in response to this parameter being absent, the at least one item of information is not computed;

necessary; wherein, in response to this parameter being absent, a default value is used and the at least one item of information is represented in shaded form; and optional; wherein, in response to this parameter being absent, a default value is used and the at least one item of information is represented in a normal way.

2. The method of claim 1, wherein the at least one item of information includes information that is displayed as text composed of alphanumeric characters, wherein a contrast of the alphanumeric characters depends on the level of available information about the parameters.

3. The method of claim 2, further comprising:

selecting the information that is displayed as the text composed of the alphanumeric characters; and in response to the selection of the information that is displayed as the text composed of the alphanumeric characters being made, opening a graphic window containing a list of names of the parameters, the parameters being able to be validated, modified, or completed using the man-machine interface.

4. The method of claim 1, wherein the man-machine interface is a touch-sensitive surface arranged on the visualization device.

5. The method of claim 1, wherein the at least one item of information includes information that is displayed as text composed of alphanumeric characters, wherein a colour of the alphanumeric characters depends on the level of available information about the parameters.

6. The method of claim 1, wherein the at least one item of information includes information that is displayed as text composed of alphanumeric characters, wherein a size of the alphanumeric characters depends on the level of available information about the parameters.

* * * * *